United States Patent Office 2,829,082
Patented Apr. 1, 1958

2,829,082

FUNGICIDAL COMPOSITION COMPRISING 2-AMINO-3-CHLORO-1,4 - NAPHTHOQUINONE AND METHODS OF USING SAME

George E. O'Brien, East Haven, Conn., assignor to United States Rubber Company, New York, N. Y., a corporation of New Jersey No Drawing. Application November 18, 1953
Serial No. 392,988

5 Claims. (Cl. 167—32)

This invention relates to new and useful improvements in fungicides, and more particularly systemic fungicides for protecting plants. The term "plant" or "plants" is used herein as inclusive of the whole plant and various plant parts, such as seeds, flowers, fruits, vegetables and foliage.

I have found that 2-amino-3-chloro-1,4-naphthoquinone is an effective systemic fungicide. Systemic fungicides can enter the plant and protect it from the inside from attack by fungi, thus protecting new flowers, fruits, vegetables and foliage as they emerge as well as the parts initially contacted with the fungicide. On the other hand, other fungicides protect only the treated surface and form a barrier against fungus infection of the parts actually treated, but do not enter the plant to protect newly emerged flowers, fruits, vegetables and foliage.

The 2-amino-3-chloro-1,4-naphthoquinone, a known material, may be used to protect healthy seed and to disinfect diseased seed. In seed treatment, it may be applied to the seeds by tumbling with the chemical alone, or with the chemical admixed with a powdered solid carrier, such as the various mineral silicates, e. g. mica, talc, pyrophillite, and clays. It may also be applied to the seeds in admixture with a conventional surface-active dispersing agent, with or without additional powdered solid carrier, as by first wetting the mixture with a small amount of water and then tumbling the seeds in the slurry. It may be applied as a liquid or spray in a liquid carrier, as in solution in a suitable solvent, or suspended in a suitable non-solvent, for example, water. The 2-amino-3-chloro-1,4-naphthoquinone may be applied to plants, including flowers, fruits, vegetables and foliage by spraying with an aqueous solution of the chemical containing a surface-active dispersing agent. It may be admixed with powdered solid carriers, such as mineral silicates, together with small amounts of a surface-active dispersing agent so that a wettable powder is obtained which may be applied directly to plants to be protected against fungi, or which may be shaken up with water, to form a suspension of the chemical (and powdered carrier) in water for application in that form. The chemical may be applied to plants to be protected against fungi by the aerosol method. Solutions for the aerosol treatment may be prepared by dissolving the chemical directly in the aerosol carrier which is liquid under pressure but which is a gas at ordinary temperature (e. g. 20° C.) and atmospheric pressure, or the aerosol solution may be prepared by first dissolving the chemical in a less volatile solvent and then admixing such solution with the highly volatile liquid aerosol carrier.

The following illustrates the invention:

Infected barley seeds are treated with 1% of the seed weight of 2-amino-3-chloro-1,4-naphthoquinone in the following manner: A 10 gram sample of barley seed, known to be entirely infected with *Helminthosporium sativum*, the seed-borne blight disease of barley, is placed in a wide mouth 2 oz. jar. The 2-amino-3-chloro-1,4-naphthoquinone is ground uniformly in a mortar to fine particle size for seed treatment, and 100 mg. of the chemical is weighed on an analytical balance and added to the jar containing the infected seed. The jar cover is lined with glazed paper, then screwed down. The jar containing the chemical plus seed is then shaken vigorously for 30 seconds to accomplish initial distribution of the chemical on the seed. To complete seed treatment and insure even distribution of the chemical over the seed, the jar is placed on a seed treatment wheel and slowly rotated for 30 minutes. Twenty-five of the thus treated seeds are planted in ordinary soil in one row of a flat. The planted seeds are lightly covered with soil and uniformly watered with one liter of tap water. A large number of replicates of untreated seeds are also similarly planted. The planted flats are placed in the greenhouse to wait plant emergence.

About 10 days after planting, emerged seedlings approximately 3 inches in height are carefully removed from the soil and scored for both emergence and disease control. At this stage of seedling growth the disease is observed most frequently on the coleoptile of the plants. The more severely infected seedlings have dark brown lesions near the soil line. Lesions occasionally extend into the leaf blade. Disease ratings are given with reference to the number of emerged seedlings. Thus, if out of one group of the 25 seed planted 20 seedlings emerge, 15 of which are clean (free from disease) and 5 infected with disease, the test chemical will be rated as having given 75% disease control and 80% germination.

In the above tests, the untreated (check) seeds showed 86% germination with only 6% of the emerged seedlings disease free; i. e., 87% of the emerged seedlings were diseased. The seeds treated with 1% of the seed weight of 2-amino-3-chloro-1,4-naphthoquinone showed 81% germination with 85% of the emerged seedlings disease free. This illustrates the high effectiveness of the 2-amino-3-chloro-1,4-naphthoquinone as a seed disfectant, and a systemic fungicide in controlling the disease on the seedlings emerging from the infected seeds treated with the 2-amino-3-chloro-1,4-naphthoquinone before planting.

Having thus described my invention, what I claim and desire to protect by Letters Patent is:

1. The method of controlling fungi on plants which comprises applying 2-amino-3-chloro-1,4-naphthoquinone to plants.

2. The method of disinfecting seed which comprises coating the seed with 2-amino-3-chloro-1,4-naphthoquinone.

3. A fungicidal composition comprising 2-amino-3-chloro-1,4-naphthoquinone and a surface-active dispersing agent.

4. A fungicidal composition comprising 2-amino-3-chloro-1,4-naphthoquinone and a powdered solid carrier.

5. A fungicidal composition comprising 2-amino-3-chloro-1,4-naphthoquinone and a powdered mineral silicate and a surface-active dispersing agent.

References Cited in the file of this patent

UNITED STATES PATENTS

| | | |
|---|---|---|
| 2,430,722 | Ladd | Nov. 11, 1947 |
| 2,647,123 | Calandra | July 28, 1953 |

OTHER REFERENCES

Youmans et al.: Bacteriostatic Activity of 3500 Organic Compounds for *Mycobacterium tuberculosis* var. *hominis*, Review No. 4, Nat'l. Res. Coun., Wash., D. C., 1953, pp. 57, 58, 302.

Chem. Absts., vol. 15, 1922, p. 2089.